April 20, 1954     J. D. HAMAKER     2,675,922
BOOKRACK
Filed April 14, 1948
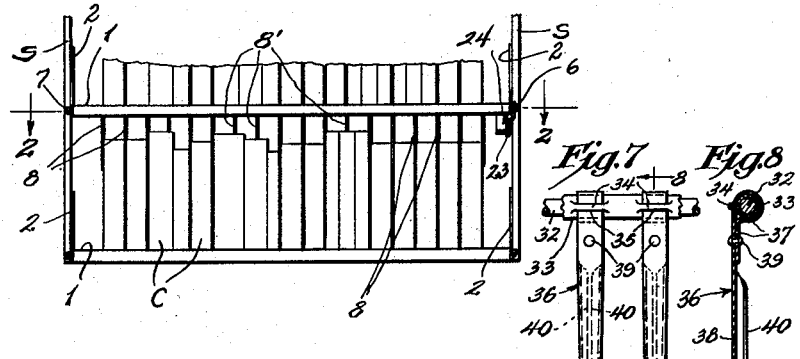
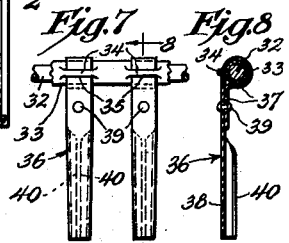
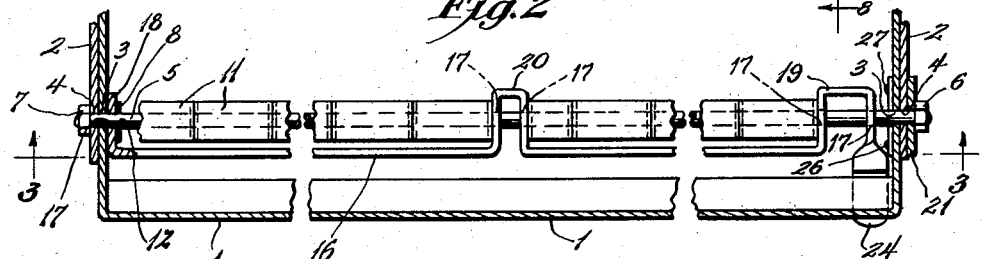
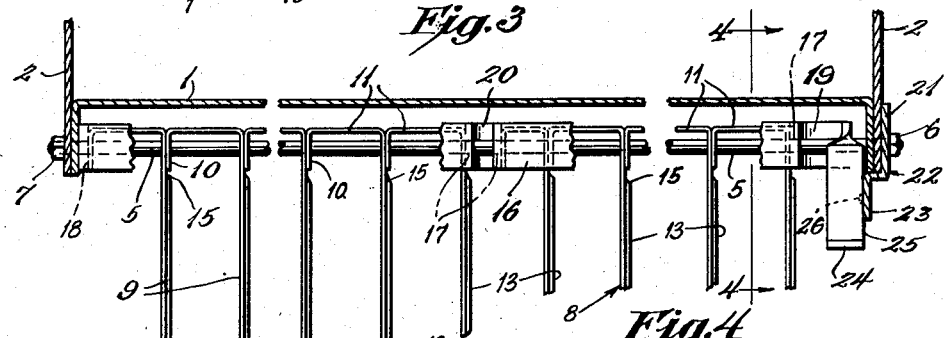
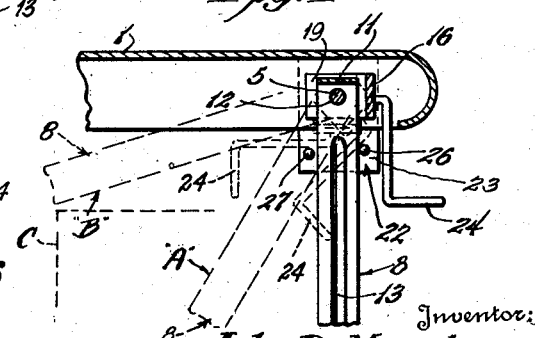
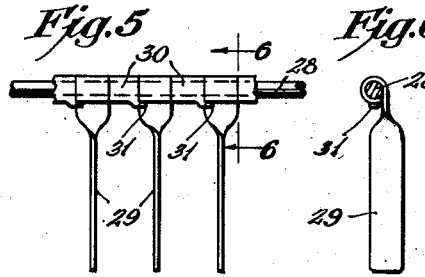
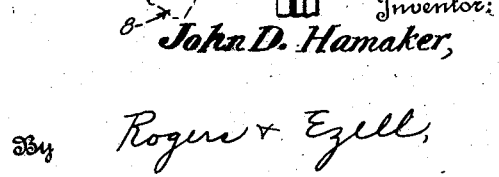
Inventor:
John D. Hamaker,
By Rogers & Ezell,
Attorneys Patented Apr. 20, 1954

2,675,922

UNITED STATES PATENT OFFICE 2,675,922

BOOKRACK

John D. Hamaker, Kirkwood, Mo.

Application April 14, 1948, Serial No. 20,896

2 Claims. (Cl. 211—43)

The present invention relates generally to book racks, and more particularly to a device providing a novel supporting means for maintaining books in an upright position on library or other shelves, so that they will not fall over when adjacent books are removed.

One object of the present invention is to provide such a supporting means which can quickly and easily be moved to an inoperative position to facilitate arranging the books on the shelves.

Another object is to provide a supporting means for books which will prevent damage to their bindings.

Further objects and advantages of the present invention will be apparent from the following description, reference being had to the accompanying drawing wherein a preferred embodiment of the present invention is shown.

Fig. 1 is a front elevational view of one form of the invention;

Fig. 2 is a horizontal section on the line 2—2 of Fig. 1;

Fig. 3 is a cross-sectional view on the line 3—3 of Fig. 2;

Fig. 4 is a cross-sectional view on the line 4—4 of Fig. 3;

Fig. 5 is a front elevational view of a modified form of pendant and pendant support;

Fig. 6 is a cross-sectional view on the line 6—6;

Fig. 7 is a front elevational view of another modified form of pendant and pendant support; and Fig. 8 is a cross-sectional view on the line 8—8 of Fig. 7.

Referring to the drawings more particularly by reference numerals, there are a pair of spaced standards S, to which a plurality of shelves 1 are attached. Usually the standards S are relatively narrow, so that the shelves extend beyond them and are stabilized by brackets 2, here shown as projecting toward the front of the shelving stack.

As shown in the illustrated form of shelving, each shelf has lateral flanges, and a rounded flange forming a front edge. A pair of aligned holes 3 in the lateral flanges of each shelf and a pair of corresponding holes 4 in the brackets 2 receive an elongated bolt 5, having nuts 6 and 7 on its ends. By this means, the shelves are attached to the brackets.

Prior to thus clamping the parts in assembled relation, the rod 5 has strung thereon a plurality of pendants 8, each of which has its upper end bent into a hook or inverted U-shape, to form a long arm 9, a short arm 10, and a connecting portion 11. Holes 12 are drilled in each arm 10 and the upper part of each arm 9.

When strung upon the rod by means of said aligned holes, the pendants have the short arm of each pendant abutting the long arm of the next adjacent pendant, thus holding the long arms of the pendants in spaced relation corresponding to the length of the connecting portion.

If the pendants are made from thin material, for example sheet metal, the long arm of each pendant may be formed with a rib 13 in order to make it more rigid, this rib extending from a point adjacent the free lower end 14 to a point 15 just below the surface of the contact with the short arm of the next adjacent pendant.

For simultaneously moving all of such pendants, a metal bar 16 is journaled on the rod by means of bearings formed by aligned openings 17 in right-angled and U-shaped ends 18 and 19, respectively, of such bar, and in a U-shaped intermediate portion 20 thereof (Fig. 2).

Clamped between the rod head 6 and the outside of one bracket 2 is the upper portion 21 of a clip 22, which is bent inwardly and downwardly so as to have its lower portion 23 lie in a plane slightly inwardly of the downwardly formed end portion of the shelf 1 (Fig. 3).

Formed integrally with the U-shaped end 19 of the displacing bar 16, and extending downwardly and forwardly therefrom is a lever 24 having an edge 25 in contact with the end 23 of the clip 22, as shown in Figs. 2 and 3.

Pressed from the clip 23 or formed thereon in any other way, detents 26 and 27 are spaced so that, when the lever is hooked over the detent 26, the pendants will be held in the angled position indicated by A in Fig. 4. Similarly, when the lever is hooked over the detent 27, the pendants will be held in the angled position indicated by B (Fig. 4).

As shown in Fig. 2, the bar 16 is proportioned so as to lie, in normal position, slightly spaced from the forward edges of the pendants. With the displacing bar 16 contacting at opposite ends with the vertical end portions of the shelf 1, and thus held against free movement longitudinally of the rod, there is still sufficient resilience, by reason of the U-shaped end 19 and the U-shaped intermediate portion 20, to permit the lever 24, which forms one end of the bar 16, to be manually moved over the detents 26 and 27 and be held frictionally in either the position A or B.

In operation, and starting with the shelf empty, the lever or handle 24 can be pressed downwardly, thereby causing the bar 16 to rotate on the rod 5 until it contacts and lifts all the pendants simultaneously to the elevated position shown at B in Fig. 4, the pendants being held in such elevated position, if desired, by contact of the lever over the detent 27.

With the pendants thus all swung backwardly and upwardly out of the way and held there by the friction means just described, the hands of the operator are free to arrange the books C on the shelf in any position desired, without the pendants interfering with such operation.

However, as soon as the books C are set in the position desired, the lever 24 may be released from contact with the detent 27 and returned to normal position, shown in full lines in Fig. 4.

Simultaneously with such return of the lever to normal position, the pendants will be free to drop by gravity, permitting some of the pendants to engage the sides of the books on the shelf, as indicated by 8 in Fig. 1, while those in between are held in elevated position in contact with the tops of the books in place on the shelf, as indicated by 8' in Fig. 1.

In this connection, it is apparent that the sides of a book may be engaged by pendants either in the substantially vertical position shown in full lines in Fig. 4, or in slightly elevated position shown at A, in Fig. 4. In certain cases, such as with larger books, the angled position A may be preferable, in which the pendant bears against the book nearer the center of pressure of such book.

The pendants, by the engagement with the books, support them despite withdrawal of adjacent books, thus preserving order and arrangement for the reinsertion of books withdrawn. When a book is removed, its pendant swings downwardly by gravity, and will be reengaged when the book is restored to place. When a rearrangement of a whole shelf of books is desired, all pendants are elevated by depression of the handle 24 until it locks over the detent 27, holding the pendants well out of the way.

In the modified form of the invention shown in Figs. 5 and 6, the rod 28, instead of being fixedly clamped to the shelf as is the rod 5 in Figs. 1 to 4, it is rotatably mounted with respect thereto.

Pendants 29 are rotatably supported by the rod 28, having their upper ends rolled to fit over the rod, as shown in Fig. 6.

Alternating with the pendants are spacers 30, which are spot-welded or otherwise secured to the rod and which are provided with fingers 31 which engage the outward faces of the pendants, as shown in Fig. 5.

In this modified form of the invention, a rocking lever, similar to the lever 24 (Figs. 2 and 3) is used, but, instead of the lever being secured to, or formed as part of, the bar 16 as in Fig. 2, it is secured to the rod 28, so that, when pushed back, it rotates the rod 28 and with it the thereto attached spacers 30, thereby causing the fingers 31 on such spacers to engage and swing the pendants 29 to positions corresponding to those illustrated by dotted lines in Fig. 4, it being understood that these pendants are held in such positions by clip and detents similar to those shown in Figs. 1 to 4.

In the modified form of the invention, as shown in Figs. 7 and 8, the rod 32 is structurally and functionally the same as the rod 5, which is fixedly clamped to the shelf, as shown in Figs. 2 and 3.

Rotatably mounted on, and coextensive with the major part of the rod 32, which extends between the shelf ends and is fixedly secured thereto, is a tube 33. At spaced intervals of the tube, U-shaped brackets 34 are pressed from the tube, as shown in Fig. 7. Rotatably mounted on the tube 33 are pendants 36, which are assembled by threading the upper portion 37 of the pendant through the bracket 34 and thence upwardly and around the tube 33, with the result shown in Fig. 8, the free end being secured to the face of the pendant by a rivet 39. With this construction, the pendants are free to rotate rearwardly about the tube 33, but are restrained in their forward movement about the tube by the bracket 34, and, conversely, the pendants will be moved backwardly and upwardly when the tube 33 with its bracket 34 is rotated counterclockwise when viewed as in Fig. 3. This rotation of the tube may be produced by attaching a lever thereto, similar to the lever 24 as shown in Figs. 2 and 3.

In the form of the invention as shown in Figs. 7 and 8, the pendant differs in structure from those previously described in that the lower portions 40 are rolled onto a tubular shape to provide strength and a smooth surface for contact with the books. These wider pendants are particularly satisfactory because they do not slip down between pages of the books when they rest on the upper edges of the pages; and yet they perform the function of holding any book against falling over when its adjacent books, giving it lateral support, are removed.

While the forms of embodiment of the invention as described constitute preferred forms, it is to be understood that other forms might be adopted, all coming within the scope of the claims which follow.

What is claimed is:

1. In a book shelf having upright supports at each end, a rod extending the length of the shelf between said supports, a plurality of pendants rotatably mounted on said rod; the improvement comprising means for simultaneously rotating the pendants about the rod through a predetermined angle in one direction only, said means comprising a bar adjacent the rod with a lever attached thereto, and a clip with a plurality of detents thereon mounted adjacent one of said shelf supports, said lever cooperating with said detents to releasably hold the pendants in any one of a series of rotated positions.

2. In a book shelf having upright supports at each end, a rod member extending the length of the shelf between said supports, a plurality of pendants pivotally mounted on said rod member; the improvement comprising each of said pendants being of inverted U-shape with one leg portion longer than the other, and having aligned openings in the leg portions adjacent the upper ends thereof to receive said rod member; and means for simultaneously pivoting the pendants about the rod member through a predetermined angle in one direction only, said means including a rotatable bar member adjacent the rod member having end portions and a portion intermediate the end portions offset in relation to said bar member and pivotally mounted on the rod member, said bar member being adapted to contact and rotate said pendants when it is revolved around the rod member; and means for releasably maintaining the pendants in the pivoted position, said last mentioned means comprising a lever at one of the ends of the bar member, and a clip with a plurality of detents thereon mounted adjacent one of said shelf supports, said lever cooperating with said detents to releasably hold the pendants in any one of a series of rotated positions.

References Cited in the file of this patent

UNITED STATES PATENTS

| Number | Name | Date |
|---|---|---|
| 284,286 | Downing | Sept. 4, 1883 |
| 594,433 | Sheldon | Nov. 30, 1897 |
| 809,315 | MacCallum | Jan. 9, 1906 |
| 833,887 | MacCallum | Oct. 23, 1906 |
| 1,217,973 | Mann | Mar. 6, 1917 |
| 1,398,778 | Hawkins | Nov. 29, 1921 |
| 2,251,408 | Johnson | Aug. 5, 1941 |

FOREIGN PATENTS

| Number | Country | Date |
|---|---|---|
| 34,766 | Denmark | July 9, 1925 |
| 282,902 | Great Britain | Jan. 2, 1928 |